United States Patent [19]

Philipp

[11] Patent Number: 4,816,009
[45] Date of Patent: Mar. 28, 1989

[54] POWER TRANSMISSION SYSTEM PARTICULARLY USEFUL FOR BICYCLES

[76] Inventor: Gabriel Philipp, Yehuda Halevi 81, Tel Aviv, Israel

[21] Appl. No.: 229,955

[22] Filed: Aug. 9, 1988

[51] Int. Cl.[4] .............................................. F16H 9/00
[52] U.S. Cl. ......................................... 474/69; 74/63; 280/236; 280/256; 474/152
[58] Field of Search ..................... 474/69, 70, 79–82, 474/152, 153, 155; 280/236–238, 253, 256, 259, 262; 74/63

[56] References Cited

U.S. PATENT DOCUMENTS

| | | | |
|---|---|---|---|
| 3,929,025 | 12/1975 | Perry | 474/70 |
| 4,164,153 | 8/1979 | Moritsch etal. | 474/69 X |
| 4,560,182 | 12/1985 | Yamaguchi | 280/259 X |
| 4,608,035 | 8/1986 | Reader | 474/152 X |

Primary Examiner—Thuy M. Bui
Attorney, Agent, or Firm—Benjamin J. Barish

[57] ABSTRACT

A power transmission system particularly useful for a foot-operated bicycle comprises a pair of axle sections coaxially-mounted with respect to each other, each fixed to one of the crank arms and each rotatable independently of the other; and coupling mechanism between the pair of axle sections and the chain wheel effective to cause the angular velocity of one crank arm to decrease relative to the other for a portion of a rotary cycle, and then to increase relative to the other for the remaining portion of a rotary cycle, such that as the one crank arm approaches the lower dead-center position after completing a forceful downward stroke, the other crank arm has passed the upper dead-center position preparatory to starting another forceful downward stroke.

19 Claims, 2 Drawing Sheets

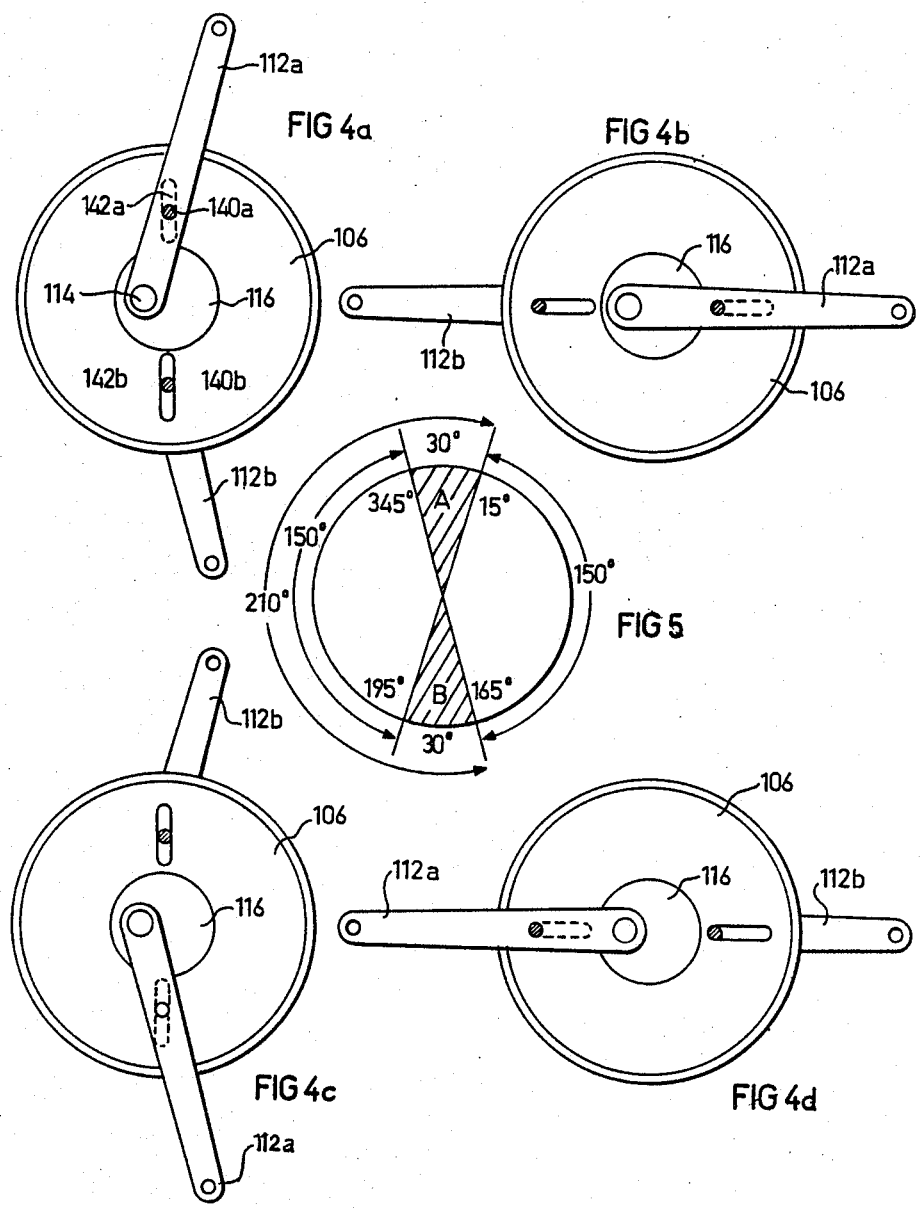

POWER TRANSMISSION SYSTEM PARTICULARLY USEFUL FOR BICYCLES

BACKGROUND OF THE INVENTION

The present invention relates to a power transmission system. The system of the present invention is particularly useful for bicycles, and is therefore described below with respect to this application.

The conventional power transmission system for bicycles includes a pair of foot pedals carried at the ends of a pair of crank arms and rotatable about a horizontal axis of the frame for rotating a chain wheel coupled by a chain to the rear wheel of the bicycle. One of the drawbacks in such a system is that it does not best exploit the power which a person can apply to the foot pedals. Thus, in the conventional bicycle the foot pedals are rigidly mounted 180° apart, and the operator applies maxiumum power in the vertical downward strokes of the foot pedals. Minimum power is applied during the generally horizontal movements of the foot pedals, namely at the beginning and ends of the downwards strokes when the foot pedals are in or near their dead-center positions, i.e., in alignment with the bottom bracket axle. Since the two foot pedals are rigidly mounted 180° apart, both reach this point of minimum power at the same time, thereby increasing the effort required by the operator to propel the bicycle.

An object of the present invention is to provide a novel power transmission system producing a more efficient transmission of power from a pair of crank arms to a driven wheel. A more particular object of the present invention is to provide a power transmission system especially useful for bicycles for providing a smoother, more uniform and more natural transmission of power from the bicycle foot pedals to the chain wheel of the bicycle, and thereby to the rear bicycle wheel.

BRIEF SUMMARY OF THE INVENTION

According to the present invention, there is provided a power transmission system particularly useful for a foot-operated bicycle including a frame and pair of crank arms rotatable with respect to the frame and coupled to a driven wheel which is rotated by rotation of the crank arms, characterized in that the transmission system comprises: a pair of axle sections coaxially-mounted with respect to each other, each fixed to one of the crank arms and each rotatable independently of the other; and coupling mechanism between the pair of axle sections and the driven wheel effective to cause the angular velocity of one crank arm to decrease relative to the other for a portion of a rotary cycle, and then to increase relative to the other for the remaining portion of a rotary cycle, such that as the one crank arm approaches a dead-center position on one side of the driven wheel after completing a forceful downward stroke, the other crank arm has passed the dead-center position on the other side of the driven wheel preparatory to starting another forceful stroke.

It will be seen that such an arrangement produces a smoother, more uniform, and more natural transmission of power from the crank arms to the driven wheel (usually a chain wheel) for the complete 360° movement of the foot pedals. It does not suffer from the difficulties of transmitting the power to the driven wheel in the dead-center position of the crank arms, or while the crank arms apply substantially horizontal forces. Moreover, the novel arrangement permits maximum transmission of power while the operator drives the pedals through curved paths which more naturally imitate walking movements than when the foot pedals are driven along reciprocatory paths. Another advantage of the present invention is that it does not require major modification of the conventional bicycle construction, but permits incorporating the improved power transmission mechanism by merely substituting a few simple parts.

Two embodiments of the invention are described below for purposes of example. In the preferred described embodiment, the end of each coupling arm opposite to its respective axle section is coupled to the driven wheel by links pivotally mounted between the respective coupling arm and the driven wheel 180° apart from each other. In a second described embodiment, each coupling arm is coupled to the driven wheel by a pin fixed to the opposite end of the coupling arm and movable in a radially-extending slot formed in the driven wheel.

Further features and advantages of the invention will be apparent from the description below.

BRIEF DESCRIPTION OF THE DRAWINGS

The invention is herein described, by way of example only, with reference to the accompanying drawings, wherein:

FIGS. 4a–4d illustrates a second form of power transmission system constructed in accordance with the present invention and also illustrate the essential parts of the system at four different points during a complete 360° rotation of the foot pedals; and FIG. 5 is a diagram helpful in illustrating the operation of the power transmission mechanism of FIGS. 2 and 3, as well as that of FIGS. 4a–4d.

DESCRIPTION OF PREFERRED EMBODIMENT

Figure 1:
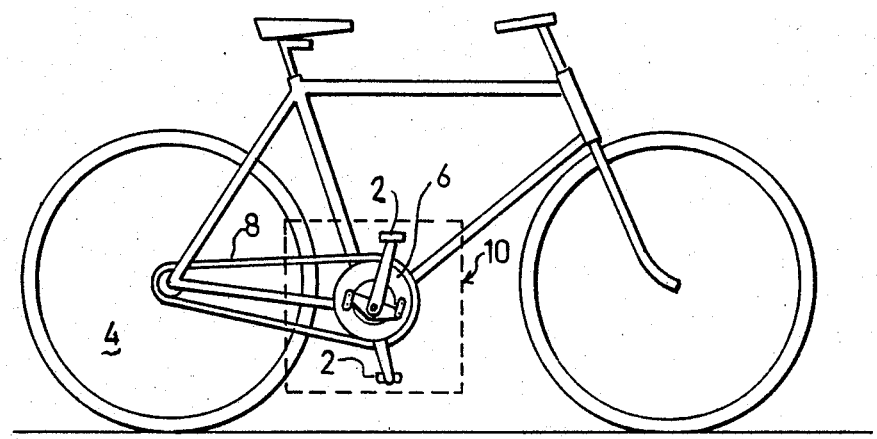
FIG. 1 illustrates a bicycle of a conventional type but including a power transmission system constructed in accordance with the present invention.

The bicycle illustrated in FIG. 1 is of a conventional type including a pair of foot pedals 2 for driving the rear bicycle wheel 4 via a chain wheel 6 and a chain 8. The illustrated bicycle, however, includes a novel power transmission system, generally designated 10, for coupling the foot pedals 2 to the chain wheel 6 in order to provide a smoother and more efficient, uniform and natural transmission of power from the foot pedals to the chain wheel.

Figure 3:
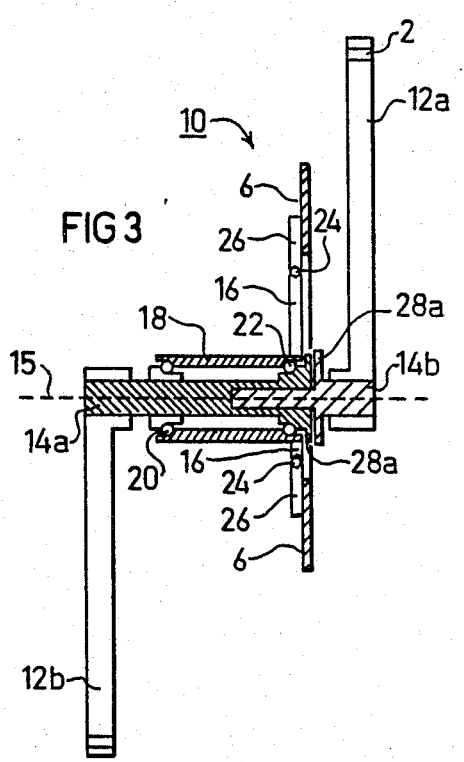
FIG. 3 is a sectional view along lines III—III of FIG. 2.
Figure 2:
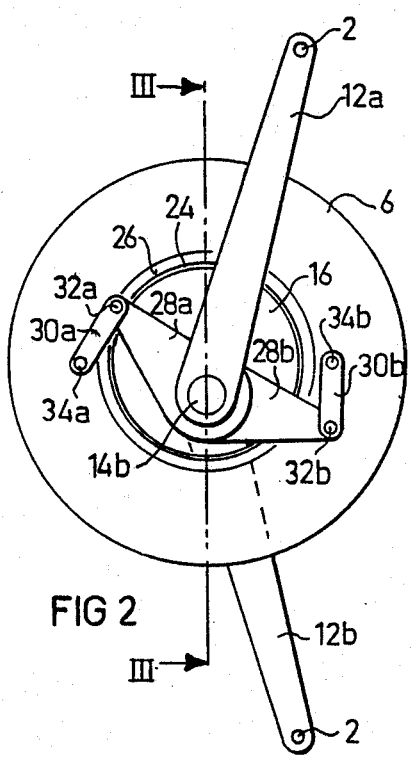
FIG. 2 is a side elevational view illustrating the power transmission system in the bicycle of FIG. 1.

The novel power transmission system 10 is more particularly illustrated in FIG. 2 and 3. It includes a pair of crank arms 12a, 12b each carrying, at its outer end, one of the foot pedals 2. The inner ends of the two crank arms 12a, 12b are fixed to axle sections 14a, 14b which are movable independently of each other. The two axle sections 14a, 14b are rotatably mounted with respect to horizontal axis 15 (FIG. 3) of the bicycle frame and are coaxially mounted with respect to each other. As shown in FIG. 2, the driven chain wheel 6 is eccentrically mounted with respect to the two axle sections 14a, 14b.

The power transmission system 10 illustrated in FIGS. 2 and 3 further includes a circular plate 16 which is fixed to the frame, via a sleeve 18, eccentrically with respect to the two axle sections 14, 14b. The two axle sections 14a, 14b are rotatably mounted to the frame sleeve 15 by a pair of circular ball bearings 20, 22. The outer rim of circular plate 16 includes a further circular ball bearing 24 which rotatably mounts an annular plate 26 secured to the chain wheel 6. It will thus be seen that annular plate 26 and chain wheel 6, eccentrically mounted to the two axle sections 14a, 14b, are rotatable with respect to both of these axle sections.

The two crank arms 12, 12b are coupled to the chain wheel 6 via the two axle sections 14a, 14b, coupling arms 28a, 28b, and links 30a, 30b, respectively, at points spaced 180° apart from each other on the chain wheel. The inner end of each link 30a, 30b is pivotally coupled by a pin 32a, 32b to the outer end of the respective coupling arm 28a, 28b; and the outer end of each link 30a, 30b is fixed by a fastener 34a, 34b to the driven chain wheel 6. Coupling arms 28a, 28b, and their links 30a, 30b, constitute a coupling mechanism between the two axle sections 14a, 4b and the driven chain wheel 6, which coupling mechanism causes the angular velocity of each of the axle sections to decrease for a minor portion of the cycle and to increase for the remainder of the cycle.

More particularly, the power transmission system illustrated in FIGS. 2 and 3 operates as follows:

Assume first that the two crank arms 12a, 12b are in initial positions as illustrated in FIG. 2, wherein crank arm 12a (at about the 15° point) has just passed its dead-center position (the 0° point) and is ready for receiving a forceful downward stroke to rotate the driven chain wheel 6 clockwise, while crank arm 12b is at the end of its forceful downward stroke (at about the 165° point) but has not yet reached its dead-center position (the 180° point). Thus the angle between the two crank arms 12a, 12b is less than 180°, i.e., about 150°.

The operator, moves one leg to apply a forceful downward stroke to crank arm 12a. Because crank arm 12a is coupled to the driven chain wheel 6 by means of axle section 14a, coupling arm 28a, and link 30a, chain wheel 6 is driven clockwise by the force applied to crank arm 12a during this downward stroke of the crank arm.

Since crank arm 12b is coupled to the chain wheel 6 via link 30b, coupling arm 28b, and axle section 14b, crank arm 12b is rotated clockwise with the chain wheel. However, because of the eccentric mounting of the chain wheel with respect to the axle section 14b of crank arm 12b, crank arm 12b is rotated at a higher angular velocity than that of chain wheel 6, as well as that of crank arm 12a. Thus, when crank arm 12a will have reached the initial position of crank arm 12b (the 165° point) at the end of the forceful downward stroke of crank arm 12a, crank arm 12b will have passed both its dead-center positions (the 180° and the 0° points) and will have arrived at the position initially occupied by crank arm 12a in FIG. 2 (the 15° point), ready for applying another forceful downward stroke to the chain wheel 6.

It will thus be seen that the arrangement illustrated in FIGS. 2 and 3 provides a very efficient, smooth, uniform, and natural transmission of power from the operator's feet to the chain wheel 6, and from the latter wheel to the rear bicycle wheel 4 for the complete 360° movement of the foot pedals.

FIGS. 4a–4d, taken with FIG. 5, more clearly illustrate the foregoing operation with respect to another type of coupling mechanism that may be used between the pair of crank arms, therein designated 112a, 112b, and the chain wheel 106, also eccentrically mounted with respect to the two axle sections, therein designated 114. In this case, the coupling mechanism comprises a pin 140a, 140b carried by each of the two crane arms 112a, 112b fixed to the two axle sections 114 and movable in a radially-extending slot 142a, 142b formed in the driven chain wheel 106.

The power transmission system illustrated in FIGS. 4a–4d also includes the circular plate 116 which is eccentrically fixed to the bicycle frame and rotatably receives the two axle sections 114 and the chain wheel 106, as described with respect to the system illustrated in FIGS. 2 and 3. It will be appreciated that, in the arrangement illustrated in FIGS. 4a–4d, the bottom bracket axle 114 is similarly constructed of two sections, corresponding to sections 14a, 14b of FIGS. 2 and 3, and that the two pins 140a, 140b could be carried at the end of coupling arms, corresponding to arms 28a, 28b in FIGS. 2 and 3. However, for purposes of simplicity, these elements have not been shown in FIGS. 4a–4d.

FIG. 4a illustrates the positions of the two crank arms 112a, 112b at the beginning of the forceful downward stroke of crank arm 112a, corresponding to the position of crank arms 12a, 12b in FIG. 2. Thus, with reference to FIG. 5, crank arm 112a would be located at the 15° point, and crank arm 112b would be located at the 165° point, the two crank arms thereby being separated by 150°.

As a forceful downward stroke is applied to crank arm 112a by the operator's leg, crank arm 112a will rotate chain wheel 106 in the same direction, i.e., clockwise, but the crank arm will move at smaller angular velocity than that of the chain wheel because of the eccentric coupling between its axle section 114 and its pin 140a to the chain wheel. This clockwise rotation of the chain wheel will rotate crank arm 112b, also clockwise, but at a larger angular velocity than the chain wheel and crank arm 112a.

FIG. 4b illustrates the position of the two crank arms when crank arm 112a is approximately in the middle of its forceful downward stroke, wherein it will be seen that crank arm 112b, having been rotated by chain wheel 106 at the higher angular velocity, has passed the 180° point (the lower dead-center point) and is now spaced 180° from crank arm 112a (rather than 150° initially).

FIG. 4c illustrates the position of the two crank arms at the end of the forceful downward stroke of crank arm 112a, wherein it will be seen that crank arm 112a has reached the 165° point, but crank arm 112b, having been driven at the higher angular velocity, has passed its upper dead-center position (the 0° point) to reach the 15° point in the next cycle, namely the position corresponding to the initial position of crank arm 112a, preparatory to its receiving a forceful downward stroke by the operator.

FIG. 4d illustrates the position of the two crank arms approximately in the middle of the forceful downward stroke of crank arm 112b, wherein both crank arms are now located precisely 180° apart.

It will thus be seen that the arrangements illustrated in the drawings produce an efficient, smooth, uniform and natural transmission of power from the operator's feet to the bicycle wheel for the complete 360° movement of the foot pedals. The novel system is therefore particularly suitable for the "mountain" bicycle, but may be used in bicycles of all other types.

It will also be seen that the described system utilizes rotary movements of the operator's legs which more closely simulate a natural walking movement in which the legs follow generally circular paths, rather than reciprocatory paths. A further advantage of the power tansmission system described is that it requires but a few simple parts which can be applied to bicycles of conventional construction, thereby minimizing the changes in existing designs in order to adapt the bicycle to include the novel transmission system.

While the invention has been described with respect to a simple bicycle construction, it will be appreciated that the invenion could be used all types bicycle constructions, for example multi-gear bicycles, bicycles equipped with Torpedo brakes, exercise bicycles, as well as in other foot operated power transmission systems. Further variations, modifications and applications of the invention will be apparent.

What is claimed is:

1. A power transmission system, particularly useful for a foot-operated bicycle, including a frame and pair of crank arms rotatable with respect to said frame and coupled to a driven wheel which is rotated by rotation of the crank arms, characterized in that said transmission system comprises:
    a pair of axle sections coaxially-mounted with respect to each other, each fixed to one of said crank arms and each rotatable independently of the other;
    and coupling mechanism between said pair of axle sections and said driven wheel effective to cause the angular velocity of one crank arm to decrease relative to the other for a portion of a rotary cycle, and then to increase relative to the other for the remaining portion of a rotary cycle, such that as said one crank arm approaches a dead-center position on one side of the driven wheel after completing a forceful stroke, the other crank arm has passed the dead-center position on the other side of the driven wheel preparatory to starting another forceful stroke.

2. The power transmission systm according to claim 1, wherein the angular velocity of each crank arm is less than the other from about 15°–165° of the rotary cycle, and is larger than the other from about 165° of one cycle to about 15° of the next cycle.

3. The power transmission system according to claim 1, wherein said driven wheel is eccentrically mounted with respect to the axis of said axle sections.

4. The power transmission system according to claim 3, wherein a circular plate is fixed to said frame eccentrically to said axle sections, and said driven wheel is rotatably mounted on said circular plate.

5. The power transmission system according to claim 1, wherein said coupling mechanism comprises a coupling arm for each of said axle sections and fixed at one end to its respective axle section, the opposite end of each coupling arm being coupled to said driven wheel.

6. The power transmission system according to claim 5, wherein said opposite end of each coupling arm is coupled to said driven wheel by a link pivotally mounted at one end to its respective coupling arm and pivotally mounted at its opposite end to the driven wheel at a point spaced 180° from the pivotal mounting of the link of the other coupling arm.

7. The power transmission system according to claim 5, wherein said opposite end of each coupling arm is coupled to said driven wheel by a pin fixed to said opposite end of the coupling arm and movable in a radially-extending slot formed in said driven wheel.

8. A bicycle comprising:
    a frame;
    a pair of foot pedals carried at the ends of a pair of crank arms rotatably mounted about a horizontal axis of the frame;
    a chain wheel driven by said crank arms and coupled by a chain to the rear bicycle wheel so as to rotate it upon rotation of the pair of foot pedals;
    and a power transmission system for transmitting the power from said pair of foot pedals to said chain wheel, comprising:
    a pair of axle sections coaxially-mounted with respect to said horizontal axis, each fixed to one of said crank arms and each rotatable independently of the other;
    and coupling mechanism between said pair of axle sections and said chain wheel effective to cause the angular velocity of one crank arm to decrease relative to the other for a minor portion of a rotary cycle, and then to increase relative to the other for the remaining portion of a rotary cycle, such that as said one crank arm approaches a lower dead-center position after completing a forceful downward stroke, the other crank arm has passed an upper dead-center position preparatory to starting another forceful downward stroke.

9. The power transmission system according to claim 8, wherein the angular velocity of each crank arm is less than the other from about 15°–165° of the rotary cycle, and is larger than the other from about 165° of one cycle to about 15° of the next cycle.

10. The power transmission system according to claim 8, wherein said driven wheel is eccentrically mounted with respect to said horizontal axis.

11. The power transmission system according to claim 8, wherein a circular plate is fixed to said frame eccentrically to said horizontal axis, and said driven wheel is rotatably mounted on said eccentric circular plate.

12. A bicycle according to claim 8, wherein said coupling mechanism comprises a coupling arm for each of said axle sections and fixed at one end to its respective axle section, the opposite end of each coupling arm being coupled to said chain wheel.

13. A bicycle according to claim 8, wherein said opposite end of each coupling arm is coupled to said chain wheel by a link pivotally mounted at one end to its respective coupling arm and pivotally mounted at its opposite end to the chain wheel at a point spaced 180° from the pivotal mounting of the link of the other coupling arm.

14. A bicycle according to claim 8, wherein said opposite end of each coupling arm is coupled to said chain wheel by a pin fixed to said opposite end of the coupling arm and movable in a radially-extending slot formed in said chain wheel.

15. A bicycle comprising:
    a frame;
    a pair of foot pedals carried at the ends of a pair of crank arms rotatably mounted about a horizontal axis of the frame;
    a chain wheel driven by said crank arms and coupled by a chain to the rear bicycle wheel so as to rotate it upon rotation of the pair of foot pedals;

and a power transmission system for transmitting the power from said pair of foot pedals to said chain wheel, comprising:

a circular plate fixed to said frame eccentrically to said horizontal axis, said chain wheel being rotatably mounted on said eccentric circular plate;

a pair of axle sections rotatably mounted with respect to said circular plate, and coaxially-mounted with respect to each other, each axle section being fixed to one of said crank arms and each rotatable independently of the other;

and coupling mechanism between said pair of axle sections and said chain wheel effective to cause the angular velocity of one crank arm to decrease relative to the other for a portion of a rotary cycle, and then to increase relative to the other for the remaining portion of a rotary cycle, such that as said one crank arm approaches a lower dead-center position after completing a forceful downward stroke, the other crank arm has passed the an upper dead-center position preparatory to starting another forceful downward stroke.

16. A bicycle according to claim 15, wherein said chain wheel is rotatably mounted on said circular plate by a ball bearing interposed between the circular plate and the chain wheel.

17. A bicycle according to claim 15, wherein said coupling mechanism comprises a coupling arm for each of said axle sections and fixed at one end to its respective axle section, the opposite end of each coupling arm being coupled to said chain wheel.

18. A bicycle according to claim 17, wherein said opposite end of each coupling arm is coupled to said chain wheel by a link pivotally mounted at one end to its respective coupling arm and pivotally mounted at its opposite end to tee chain wheel at a point spaced 180° from the pivotal mounting of the link of the other coupling arm.

19. A bicycle according to claim 17, wherein said opposite end of each coupling arm is coupled to said chain wheel by a pin fixed to said opposite end of the coupling arm and movable in a radially-extending slot formed in said chain wheel.

* * * * *